United States Patent
Gigante et al.

(10) Patent No.: US 11,320,203 B2
(45) Date of Patent: May 3, 2022

(54) ELECTRIC POWER METHOD FOR AN ELECTRIC FURNACE AND CORRESPONDING APPARATUS

(71) Applicants: DANIELI AUTOMATION S.P.A., Buttrio (IT); DANIELI & C. OFFICINE MECCANICHE S.P.A., Buttrio (IT)

(72) Inventors: Enzo Gigante, Porpetto (IT); Federico Pasut, San Vito al Tagliamento (IT); Andrea Polo, San Giovanni al Natisone (IT)

(73) Assignees: DANIELI AUTOMATION S.P.A., Buttrio (IT); DANIELI & C. OFFICINE MECCANICHE S.P.A., Buttrio (IT)

( * ) Notice: Subject to any disclaimer, the term of this patent is extended or adjusted under 35 U.S.C. 154(b) by 0 days.

(21) Appl. No.: 17/050,831

(22) PCT Filed: Apr. 24, 2019

(86) PCT No.: PCT/IT2019/050082
§ 371 (c)(1),
(2) Date: Oct. 26, 2020

(87) PCT Pub. No.: WO2019/207611
PCT Pub. Date: Oct. 31, 2019

(65) Prior Publication Data
US 2021/0231372 A1    Jul. 29, 2021

(30) Foreign Application Priority Data
Apr. 24, 2018    (IT) .................. 102018000004846

(51) Int. Cl.
*H05B 7/148*    (2006.01)
*H05B 7/144*    (2006.01)
(Continued)

(52) U.S. Cl.
CPC ................ *F27B 3/085* (2013.01); *F27B 3/28* (2013.01); *F27D 11/10* (2013.01); *H05B 7/144* (2013.01)

(58) Field of Classification Search
CPC .. F27B 3/085; F27B 3/28; F27D 11/08; F27D 11/10; H05B 7/144; H05B 7/148;
(Continued)

(56) References Cited

U.S. PATENT DOCUMENTS 4,320,245 A * 3/1982 Gaydon ................ C21C 5/5229
                                                      373/104
4,388,108 A * 6/1983 Rozenberg ............ H05B 7/144
                                                      373/104
(Continued)

FOREIGN PATENT DOCUMENTS

DE    30 35 508 A1    5/1982

OTHER PUBLICATIONS

International Search Report and Written Opinion for PCT/IT2019/050082, dated Jul. 3, 2019.

*Primary Examiner* — Hung D Nguyen
(74) *Attorney, Agent, or Firm* — Marshall, Gerstein & Borun LLP

(57) ABSTRACT

An electric power method for an electric arc furnace includes regulating the electric power frequency of a power voltage and a power current of the electrodes, independently from the mains frequency.

12 Claims, 5 Drawing Sheets

(51) Int. Cl.
*F27B 3/08* (2006.01)
*F27B 3/28* (2006.01)
*F27D 11/10* (2006.01)

(58) Field of Classification Search
CPC .......... H05B 7/152; H05B 7/156; H05B 7/18;
H05B 7/20; H02J 3/1864; H02J 3/1892;
Y02E 40/10; Y02P 10/20; Y02P 10/216;
Y02P 10/25; Y02P 10/256; Y02P 10/259
USPC .............................. 373/60, 70, 102, 104, 108
See application file for complete search history.

(56) References Cited

U.S. PATENT DOCUMENTS

| | | | | |
|---|---|---|---|---|
| 4,677,643 A * | 6/1987 | Dicks | ...................... | H05B 7/156 373/105 |
| 5,438,588 A * | 8/1995 | Wanner | .................. | H05B 7/148 373/108 |
| 5,463,653 A * | 10/1995 | Du Parc | ................ | H02M 7/162 373/108 |
| 5,533,044 A * | 7/1996 | Strebel | .................... | H05B 7/156 373/104 |
| 5,610,937 A * | 3/1997 | Gaupp | .................. | C21C 5/5229 373/104 |
| 5,617,447 A * | 4/1997 | Tambe | .................. | H02J 3/1892 373/102 |
| 5,627,454 A * | 5/1997 | Aebischer | ............. | H02J 3/1892 373/105 |
| 5,809,054 A * | 9/1998 | Oelscher | ............... | H02J 3/1892 373/104 |
| 2008/0063024 A1* | 3/2008 | Pasch | .................... | H05B 7/148 373/105 |
| 2011/0176575 A1* | 7/2011 | Horger | .................. | H05B 7/144 373/104 |

* cited by examiner

ELECTRIC POWER METHOD FOR AN ELECTRIC FURNACE AND CORRESPONDING APPARATUS

FIELD OF THE INVENTION

The present invention concerns an electric power method for an electric arc furnace and the corresponding control apparatus.

In particular, the present invention is applied in the field of electric furnaces used to melt metal materials.

Preferred embodiments of the present invention, although non-restrictive, are intended for three-step electric arc furnaces.

BACKGROUND OF THE INVENTION

The melting cycle of an arc furnace normally provides the following operating steps:

loading metal material, usually scrap, into the furnace by means of baskets that unload from above, or by means of continuous-loading transport apparatuses fed with scrap and/or direct reduced iron (DRI);

generating the electric arc, during which the electrodes are lowered toward the metal material until they trigger the melting electric arc that is generated between the end of the electrodes and the material to be melted;

perforating the layer of metal material by means of the electric arc generated, during which the actual melting of the scrap begins to bring them to complete fusion;

forming the molten metal bath;

refining the molten material to regulate the temperature of the bath and the carbon content of the steel and/or defining a desired composition of the steel by adding chemical components;

tapping the molten material present in the electric furnace, after possible deslagging.

The loading, electric arc generation, and perforating operations can be repeated several times during a single melting cycle. For example, after a first charge of metal material in the furnace and the melting of the charge, the introduction of a further charge of metal material, and the subsequent melting thereof, can be provided before proceeding with the refining of the molten material.

In the case of a continuous charge melting process, the melting cycle described above is different and generally provides loading a first basket into the furnace, the subsequent melting to generate a sufficient liquid heel level and the subsequent continuous introduction of the material to be melted to reach a desired quantity to be tapped.

During the perforation steps, the electric arc between the electrodes and the charge of metal material has a very unstable behavior, which progressively improves as melting proceeds. In the meantime this causes unexpected and sudden changes in the power absorbed which also have negative repercussions on the mains electric power supply network, with possible damage to the user devices supplied by the electric power supply network.

During perforating and melting, in fact, the scrap collected and not yet melted can collapse on the electrodes generating short circuit conditions which correspond to a considerable reduction of the active power useful for the melting operations and a rapid increase of the current absorbed by the mains electric network.

As the melting proceeds, that is, when the arc is appropriately shielded from the solid material or from the foamy liquid (slag), the behavior of the electric arc becomes more and more stable, allowing in this way to increase its length, thus also increasing the thermal power transferred to the material to be melted. The voltage and the length of the arc are regulated as a function of the melting process and so as to prevent excessive wear of the refractory.

In order to limit the undesired effects on the power network, it is known to perform a rapid regulation of the power supplied to the furnace by means of a continuous regulation at least of the position of the electrodes and the voltage and current parameters imparted to the electrodes.

In particular, the voltage and current parameters, as well as the position of the electrodes, are suitably regulated in each step of the process.

The position of the electrodes with respect to the material to be melted determines the length of the electric arc; furthermore, as the length of the arc is a function of the interdependence between current-voltage-impedance, it is necessary to increase the applied voltage to support the arc and prevent it from switching off, sacrificing the active power in the perforation steps, by lowering the power factor and therefore the performance, in favor of the reactive power. On the contrary, if the arc shortens, the current increases with an uncontrolled increase in the power supplied by the arc and with possible damage to the electric furnace or to its vault.

FIG. 1 shows schematically the reference values, or set point values, of the electric parameters to be applied to the electrodes, during the feed of a melting cycle with three baskets, that is in which it is provided to load a first basket of metal material into the furnace, melt it, load a second basket of metal material, melt this as well, load a third basket of metal material and melt it, and subsequently refine the whole liquid material obtained.

It is possible to note that the electric parameters of current, voltage and power undergo variations, while the power frequency of the electrodes remains unchanged during the melting cycle, remaining the same as the power frequency.

As a first approximation, the arc voltage, the current being equal, is proportional to the distance between the electrode and the mass to be melted. For a given functioning condition, which provides to reach a reference current of the arc, a stable arc condition is achieved, that is a constant current condition over time, by regulating the distance between the electrode and the mass to be melted, in relation to a characteristic power voltage curve.

Power apparatuses of the known type generally comprise a multi-tap transformer, that is, provided with a plurality of transformation ratios that can be selectively set in relation to the required powers. The transformer transforms the voltage supplied by an electric power network, generally at medium voltage, into a voltage suitable to power the electrodes.

By means of the taps of the transformer and the continuous regulation of the height of the electrodes it is possible to follow the desired impedance/admittance points, and therefore regulate the arc voltage and the arc length, to determine the melting power.

However, these known types of power apparatuses also have a disadvantage linked to the wide variation in instantaneous absorption of power which is taken from the power network and which occurs in particular during the perforation due to the collapse of the scrap metal which causes short circuits of the steps with corresponding arc length equal to zero.

During the perforation, given the variability in power absorption by the furnace, mains voltage fluctuations are generated, causing the so-called flicker phenomenon. As the melting process can vary greatly in terms of current fluctuation, therefore in terms of voltage drop, given the same frequency, it is important to try to keep the electric arc as stable as possible, in order to limit said flicker effect.

In order to have the necessary conditions for a stable arc, the system is sized by suitably choosing the inductive reactance value that the circuit must have for the determinate power frequency of the network. The overall reactance, suitably sized in the design step, is obtained by the sum of the reactances of the conductors, the transformer and possible additional reactors.

The additional reactors, in an electrical power system of an electric arc furnace, are determined as a function of the reactance value to be reached. The additional reactors allow to intervene on the management of the reactive power with respect to the active power (the reactance, in fact, produces a phase difference between the current and the voltage of the circuit, allowing to regulate the power factor), thus influencing the stability of the arc.

The state of the art includes document DE 30 35 508. This document concerns a system in which it is provided, in a general manner, to vary the power frequency of an electric arc furnace by means of a convertor unit.

One purpose of the present invention is to perfect an electric power method for an electric arc furnace which increases the efficiency of the melting process.

Another purpose of the present invention is also to perfect an electric power method for an electric arc furnace which reduces, and even eliminates, the negative effects generated by the electric power fluctuations of the electric furnace.

Another purpose of the present invention is also to perfect an electric power method for an electric arc furnace which allows to reduce the time of each melting cycle.

Another purpose of the present invention is to provide an electric power apparatus for an electric arc furnace which is simple and economical.

Another purpose of the present invention is to provide an electric power apparatus for an electric arc furnace which is efficient and reduces the times of each melting cycle.

Another purpose of the present invention is to provide an electric power apparatus for an electric arc furnace which has limited bulk, while still allowing to reach a reactance value which allows the plant to function properly.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, an electric power method for an electric arc furnace, according to the present invention, comprises:

the supply of mains alternating voltage and current by means of a mains power network, at a predefined mains frequency;

the transformation of said mains voltage, current and frequency into alternating base voltage, current and frequency, and wherein said base voltage and current are selectively settable, and said base frequency is substantially equal to said mains frequency;

the rectifying of said base voltage and current by a plurality of rectifiers to obtain a direct voltage and current;

the conversion, by a plurality of convertors, of said direct voltage and current into a power alternating voltage and current selectively settable by means of a control and command unit connected to said convertors;

the feeding of said power voltage and current to a plurality of electrodes of the electric furnace.

According to one aspect of the invention, during each step of a melting cycle of said electric furnace, the control and command unit is provided with regulation devices that regulate an electric power frequency of said power voltage and current of the electrodes, independently of said mains frequency, obtaining a regulation, possibly also instantaneous, of the reactance of the electric power apparatus of the electric furnace.

The possibility of regulating the electric power frequency of the electric furnace allows to:

improve the arc stability and therefore the transfer of energy over time;

reduce the amount of flicker in the electric network.

A regulation of the electric power frequency has a direct impact on the value of the reactance and therefore on the power factor with which the furnace is powered; the arc stability and therefore the transfer of power to the material to be melted is strongly linked to this parameter.

In fact, the inductive reactance can be determined by the following relation:

$$Xr = 2 * \pi * f * L$$

wherein:

Xr is the value of the inductive reactance [Ohm]

f is the electrical power frequency [Hz]

L is the value of the inductance [H] which is usually related to the sizes and the construction geometry of the inductive components.

From this relation it is possible to appreciate that, given the same the inductive reactance, an increase in power frequency allows to reduce the value of the inductance and therefore the physical dimensions of the inductive components. The value of the inductance is a physical parameter that depends on various factors such as the materials of the magnetic core, the geometry, the disposition of the coils, and the number of spirals. Therefore, once a geometry and the material are fixed, given the same the reactance value, the increase in frequency, and therefore the reduction of the inductance can also entail a reduction of the spaces. This therefore allows to reduce the installation bulks of the electric power apparatuses.

Embodiments of the present invention also concern an electric power apparatus for an electric arc furnace comprising:

a transformer connected to a mains electric network to supply a mains alternating voltage and current and configured to transform said mains alternating voltage and current, having a predefined mains frequency, into an alternating base voltage and current having a base frequency equal to the mains frequency;

a plurality of rectifiers connected to the transformer and configured to transform the base voltage and current into a direct electric voltage and current;

a plurality of convertors connected to said rectifiers and configured to convert the direct voltage and current into an alternating power voltage and current, said convertors being connected to electrodes of said melting furnace and to a control and command unit configured to control and command the functioning of said convertors to regulate over time the power voltage and current.

According to one aspect of the present invention, the control and command unit is provided with regulation devices configured to regulate, during each step of a melting cycle of said electric furnace, the electric power frequency of the electric power supply, independently of the mains frequency, and thus obtain a consequent variation in the reactance of said power apparatus.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
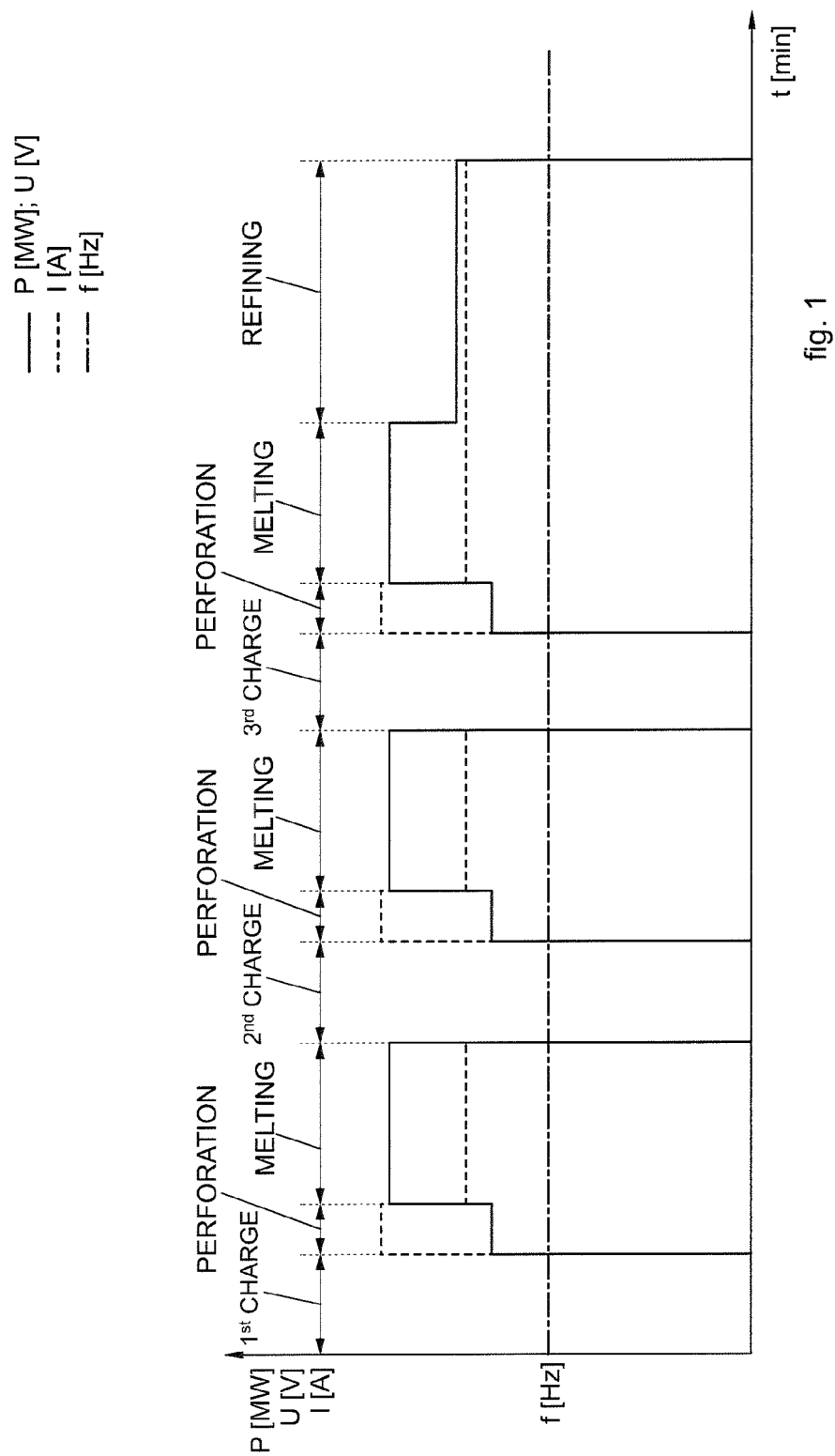
FIG. 1 is a diagram showing the variation over time of the electric parameters applied to the electrodes during a melting cycle according to the state of the art.
Figure 2:
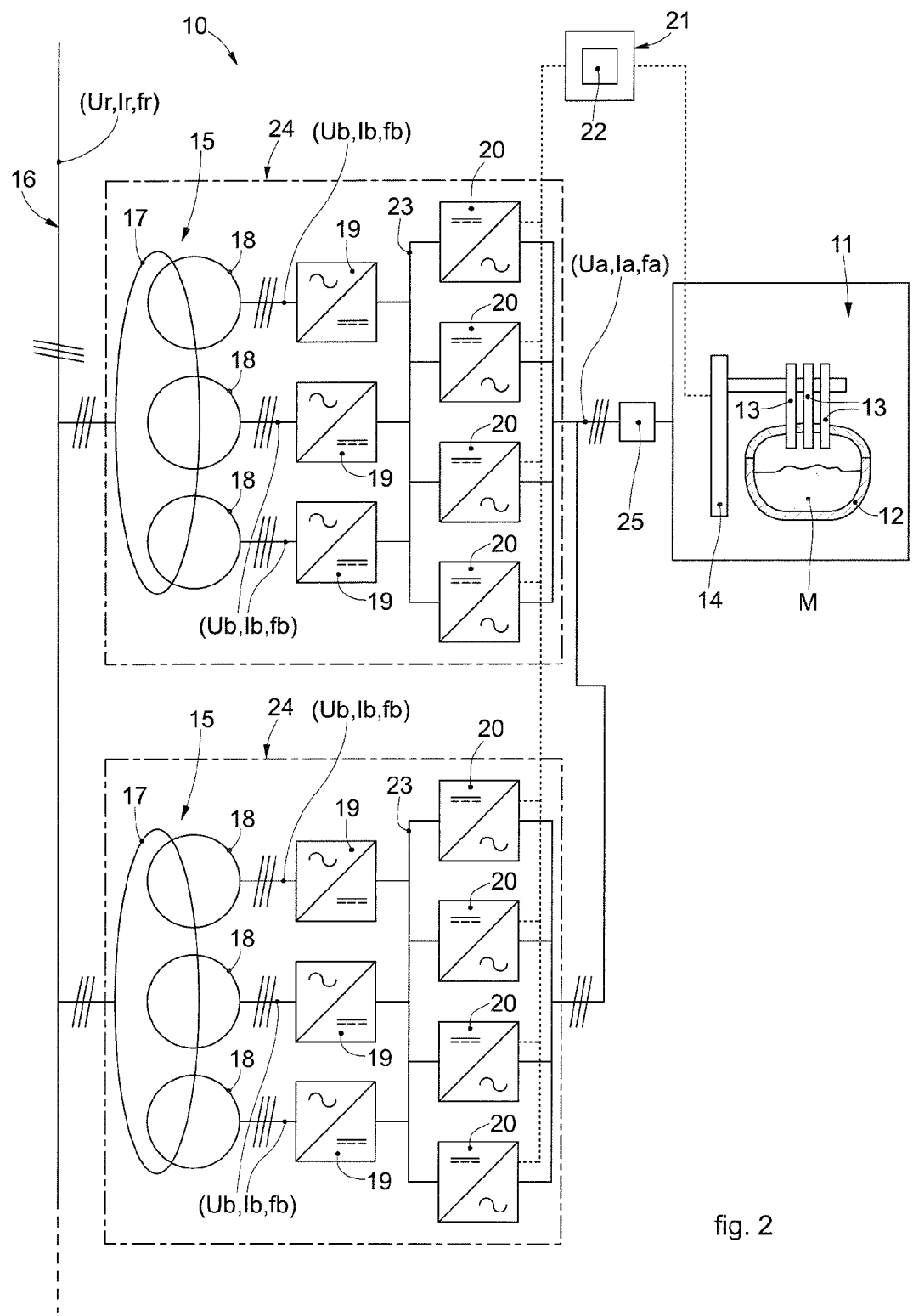
FIG. 2 is a schematic view of an electric power apparatus of an electric arc furnace according to embodiments of the present invention.

Embodiments of the present invention concern an electric power apparatus, indicated as a whole with the reference number 10 (FIG. 2) and configured to power an electric arc furnace 11.

The electric furnace 11 comprises a container 12, or shell, in which metal material M is introduced to be subsequently melted.

The loading of the metal material M can occur with the use of baskets, that is in discontinuous mode as described with reference to FIG. 3, or in continuous mode as described with reference to FIGS. 4 and 5.

Figure 3:
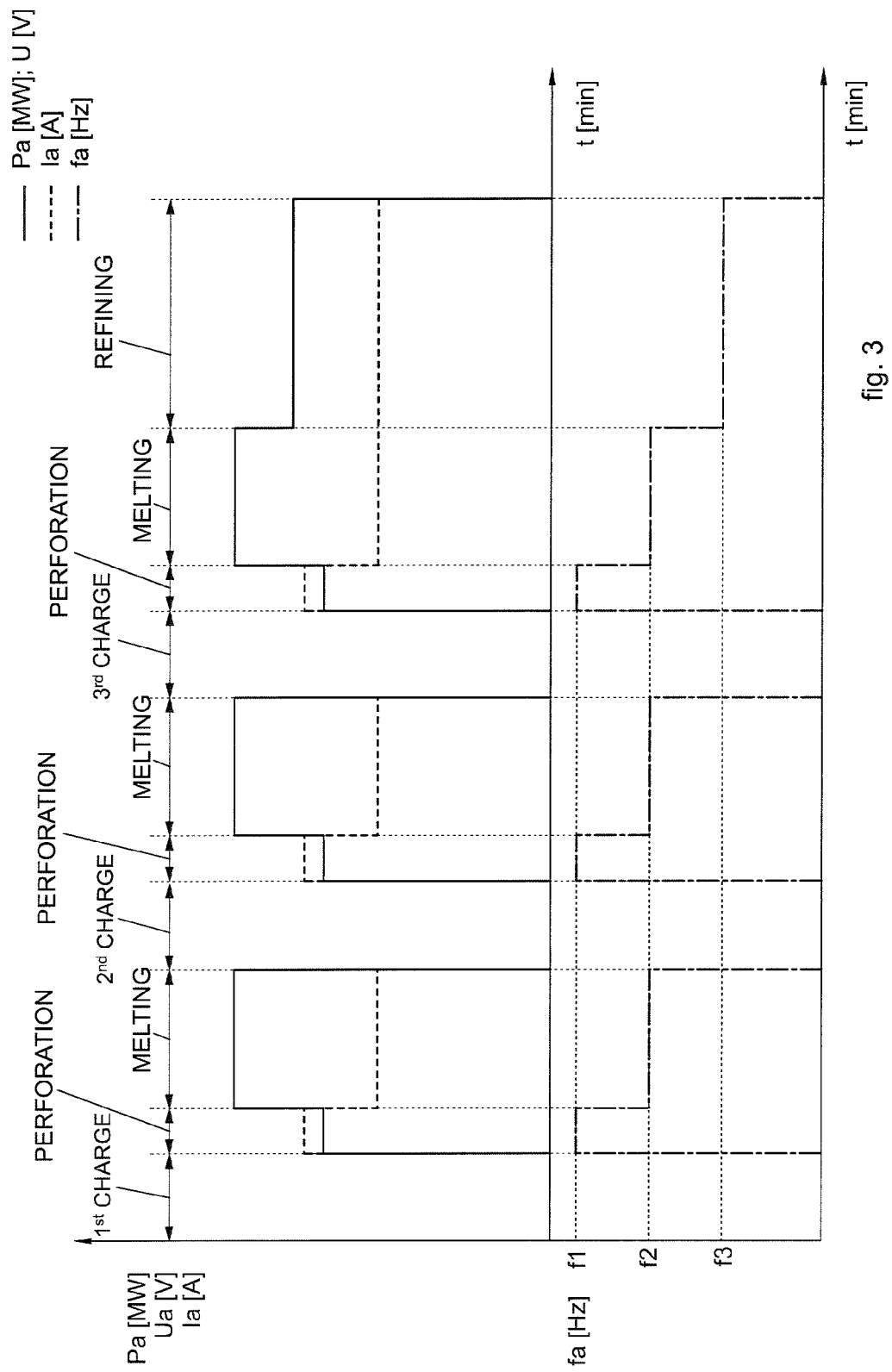
FIG. 3 is a diagram showing the variation over time of the electric parameters applied to the electrodes during a melting cycle with basket loading according to embodiments of the present invention.
Figure 4:
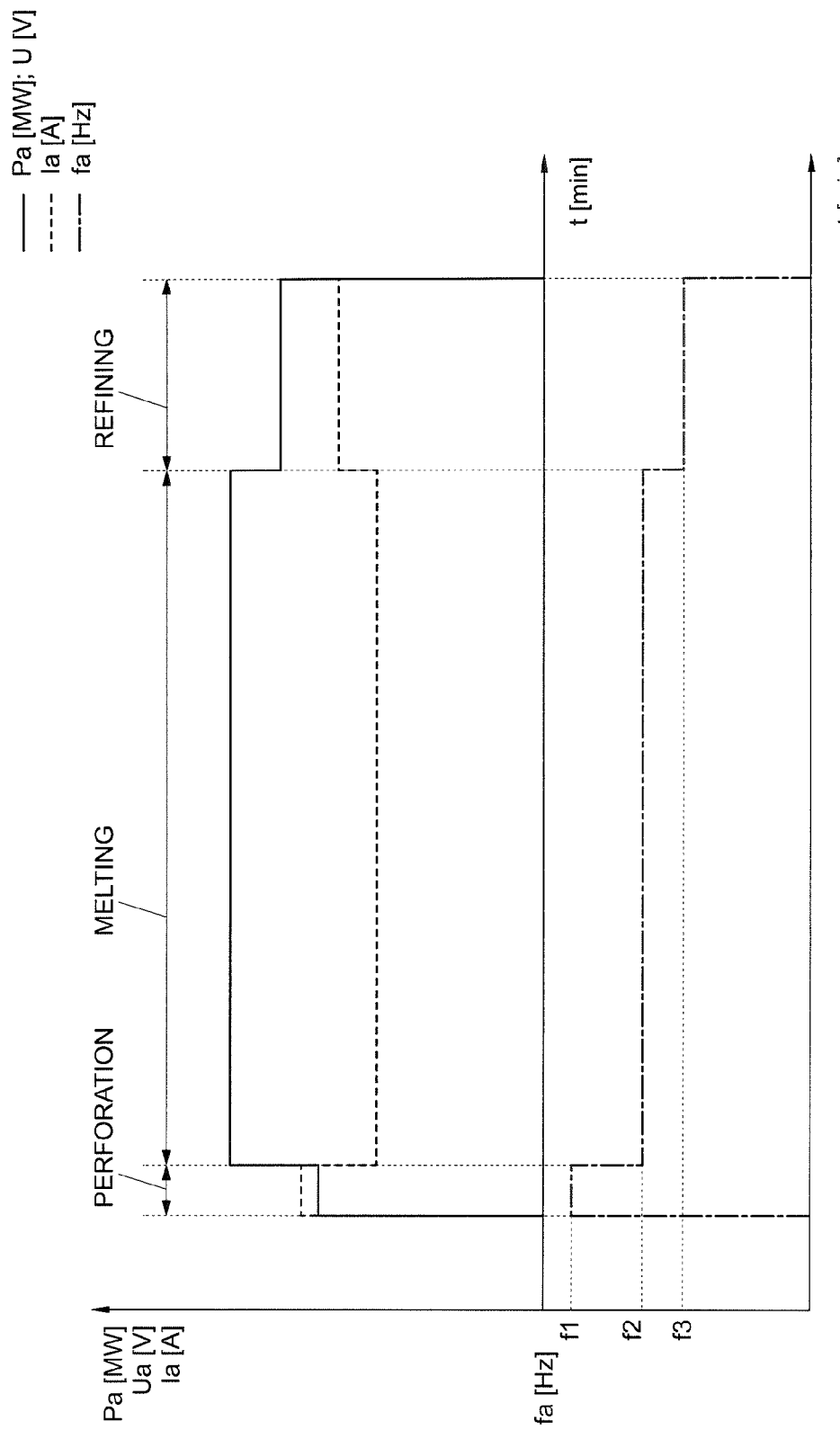
FIG. 4 is a diagram showing the variation over time of the electric parameters applied to the electrodes during a melting cycle with continuous loading of scrap according to embodiments of the present invention.

In the case shown in FIGS. 3 and 4 it is provided to load metal material M comprising scrap. In the solution shown in FIG. 5 is provided to load metal material M in the form of DRI.

The electric furnace 11 is also provided with a plurality of electrodes 13, in the case shown three electrodes 13, configured to trigger an electric arc through the metal material M and melt it.

According to some embodiments of the present invention, the electrodes 13 are installed on movement devices 14 configured to selectively move the electrodes 13 toward/away from the metal material M.

The movement devices 14 can be chosen from a group comprising at least one of either a mechanical actuator, an electric actuator, a pneumatic actuator, a hydraulic actuator, an articulated mechanism, a mechanical kinematic, similar and comparable members or a possible combination of the above.

According to a possible solution of the present invention, if there are three electrodes 13, each one is connected to a respective electric power phase of the electric power apparatus 10.

According to embodiments of the present invention, the power apparatus 10 comprises at least one transformer 15 connected to an electric network 16 to supply mains alternating voltage and current and configured to transform the mains power alternating voltage and current, into alternating base voltage and current.

According to a possible solution of the invention, the mains electric network 16 can be three-phase.

According to embodiments of the invention, the network voltage "Ur", and the network current "Ir", have a pre-defined mains frequency "fr".

According to possible solutions, the mains frequency "fr" is a value chosen between 50 Hz and 60 Hz, that is, according to the frequency of the electric network of the country where the furnace is installed.

According to possible solutions of the present invention, the transformer 15 can comprise a primary transformer 17 magnetically coupled to at least one secondary transformer 18.

According to a possible solution of the invention, the transformer 15 can comprise a plurality of secondary transformers 18 magnetically coupled to the primary transformer 17. This solution allows to reduce the impact of disturbances on the network side, that is reduce the harmonic content and the reactive power exchanged in the network by the combination of the transformer 15 and the rectifier 19.

The base voltage and current supplied by the transformer 15 has a base voltage "Ub", a base current "Ib", and a base frequency "fb" which are predefined and set by the design characteristics of the transformer 15 itself.

In particular, the base frequency "fb" is substantially the same as said mains frequency "fr" identified above.

The base voltage "Ub" and the base current "Ib" are instead correlated respectively to the mains voltage "Ur", and to the mains current "Ir" by the transformation ratio of the transformer 15 itself.

The transformer 15, for example of the multi-tap type, can be provided with regulation devices, not shown, provided to selectively regulate the electric transformation ratio of the transformer 15 in relation to the specific requirements.

The apparatus 10, according to the present invention, also comprises a plurality of rectifiers 19 connected to the transformer 15 and configured to transform the alternating base voltage Ub and current Ib into direct voltage and current.

Specifically, the rectifiers 19 allow to rectify the alternating base voltage Ub and current Ib, into respective direct voltages and currents.

The rectifiers 19 can be chosen from a group comprising a diode bridge and a thyristor bridge.

According to a possible solution, the rectifiers 19 comprise devices, for example chosen from a group comprising Diodes, SCR (Silicon Controlled Rectifier), GTO (Gate Turn-Off thyristor), IGCT (Integrated Gate-Commutated Thyristor), MCT (Metal-Oxide Semiconductor Controlled Thyristor), BJT (Bipolar Junction Transistor), MOSFET (Metal-Oxide Semiconductor Field-Effect Transistor) and IGBT (Insulated-Gate Bipolar Transistor).

According to a further aspect of the invention, the apparatus 10 comprises a plurality of convertors 20 connected to the rectifiers 19 and configured to convert the direct voltage and current into an alternating power voltage and current to power the electrodes 13.

According to a possible solution, the convertors 20 comprise devices, for example chosen from a group comprising SCR (Silicon Controlled Rectifier), GTO (Gate Turn-Off thyristor), IGCT (Integrated Gate-Commutated Thyristor), MCT (Metal-Oxide Semiconductor Controlled Thyristor), BJT (Bipolar Junction Transistor), MOSFET (Metal-Oxide Semiconductor Field-Effect Transistor), and IGBT (Insulated-Gate Bipolar Transistor).

The convertors 20 are connected to the electrodes 13 of the melting furnace 11 and to a control and command unit 21 configured to control and command the functioning of the convertors 20 and to regulate over time the alternating electric power of the electrodes 13.

Specifically, the control and command unit 21 controls said convertors 20 so as to selectively set the parameters of said alternating power voltage and current.

According to one aspect of the present invention, the control and command unit 21 is provided with regulation devices 22 configured to regulate the electric power frequency "fa" of the alternating power voltage and current and obtain a simultaneous variation in the reactance value of the power circuit of the electrodes.

Specifically, the power voltage and current have a power voltage Ua, and a power current Ia, which are selectively regulated in relation to the melting powers involved.

According to possible solutions of the present invention, the regulation devices 22 can comprise, by way of example only, a hysteresis modulator, or a Pulse-Width-Modulation (PWM) modulator.

These types of modulators can be used to command the semiconductor devices of the rectifiers 19 and convertors 20. The modulators, suitably controlled, generate voltage or current values to actuate the electrodes 13. In particular, the modulator processes the voltage and current values and produces drive commands at least of the rectifiers 19 and of the convertors 20 so that the quantities of voltage and current required by the control are present at the connection clamps to the electrodes 13. The voltages and currents to be actuated are the result of operations performed by the control and command unit on the basis of the quantities read by the process and on the basis of the process model.

According to the present invention, the rectifiers 19 can be connected to the convertors 20 by means of at least one intermediate circuit 23 which works in direct current.

The intermediate circuit 23 is configured to store electric energy continuously and generate a separation between the electrodes 13 and the rectifiers 19, and therefore with the electric network 16.

In particular, the rapid power fluctuations deriving from the process are partly filtered through the intermediate circuit 23 reducing their impact on the electric network 16 side.

The control and command unit 21 can also be configured to regulate the parameters of the power voltage Ua and power current Ia generated by the convertors 20 and supplied to the electrodes 13.

Embodiment solutions of the present invention provide that the control and command unit 21 is also connected, in turn, to the movement device 14 to allow to regulate the position of the electrodes 13 in relation to the different steps of the melting process.

In particular, the electrodes 13 are moved by the movement device 14 in order to follow the position of the material and therefore modify the length of the arc.

In this way, the control and command unit 21 can manage and command, in relation to the specific steps of the process, at least the following parameters: power voltage Ua, power current Ia, electrical power frequency "fa", and position of the electrodes 13. The high possibility of controlling the various parameters allows to optimize the transfer of energy to the process and simultaneously to reduce the effects on the electric network 16 deriving from the rapid variations in power on the furnace side.

According to possible solutions, the transformer, the rectifiers 19, connected to the transformer 15, and the convertors 20 together define a power module 24.

According to a possible embodiment of the invention, the apparatus 10 can be provided with a plurality of power modules 24, connected in parallel to each other, and to the electric network 16 and to the electric furnace 11.

The combination of several power modules 24 allows to obtain an apparatus 10 which is scalable in size according to the specific size of the electric furnace 11 to be powered.

According to a possible solution, the control and command unit 21 is connected to all the power modules 24 to control at least the respective convertors 20 so that each module supplies the same power voltage Ua, current Ia, and electric frequency "fa" values to the electrodes 11. In this way it is possible to prevent malfunctioning of the entire system.

According to a possible solution, the apparatus 10 can comprise an inductor configured to obtain the desired overall reactance of the apparatus.

The inductor 25 can be connected downstream of the convertors 20 and is sized so as to reach the equivalent desired total reactance. In this way, it is possible to obtain an overall reactance which is given by the contribution of the inductor 25 and by the reactance introduced by the conductors which connect the system to the furnace.

In general, the inductance is a (design) parameter that cannot be modified once the component is built.

By modifying the frequency (with respect to, for example, the mains 50 Hz) it is possible, given the same inductance, to change the reactance value assumed by the component in the circuit and therefore reach the desired equivalent total reactance value.

According to a possible solution (FIGS. 3-5), the melting cycle comprises at least one step of perforating the metal material, and a melting step.

According to possible embodiments (FIGS. 3 and 4) the melting cycle can also comprise a step of refining the molten material.

In particular, during the perforation step the electrodes 13 are brought closer to the solid metal material M that has been loaded, in order to trigger the electric arc and start the melting of the metal material M. As the metal material M gradually melts the electrodes 13 penetrate into the still solid part of the metal material M in order to progressively melt it. When the electrodes 13 reach a position inside the container 12, the real melting of the remaining metal material M surrounding the electrodes begins 13.

According to a possible solution (FIG. 3), the perforation step and the melting step can be repeated several times before the refining step, and between them a step of loading further metal material M into the electric furnace 11 is provided.

For example with reference to FIG. 3, it is provided to load the metal material, perforate the metal charge with the electrodes and melt the latter. This operating sequence is repeated three times with each loading of the metal material M.

Figure 5:
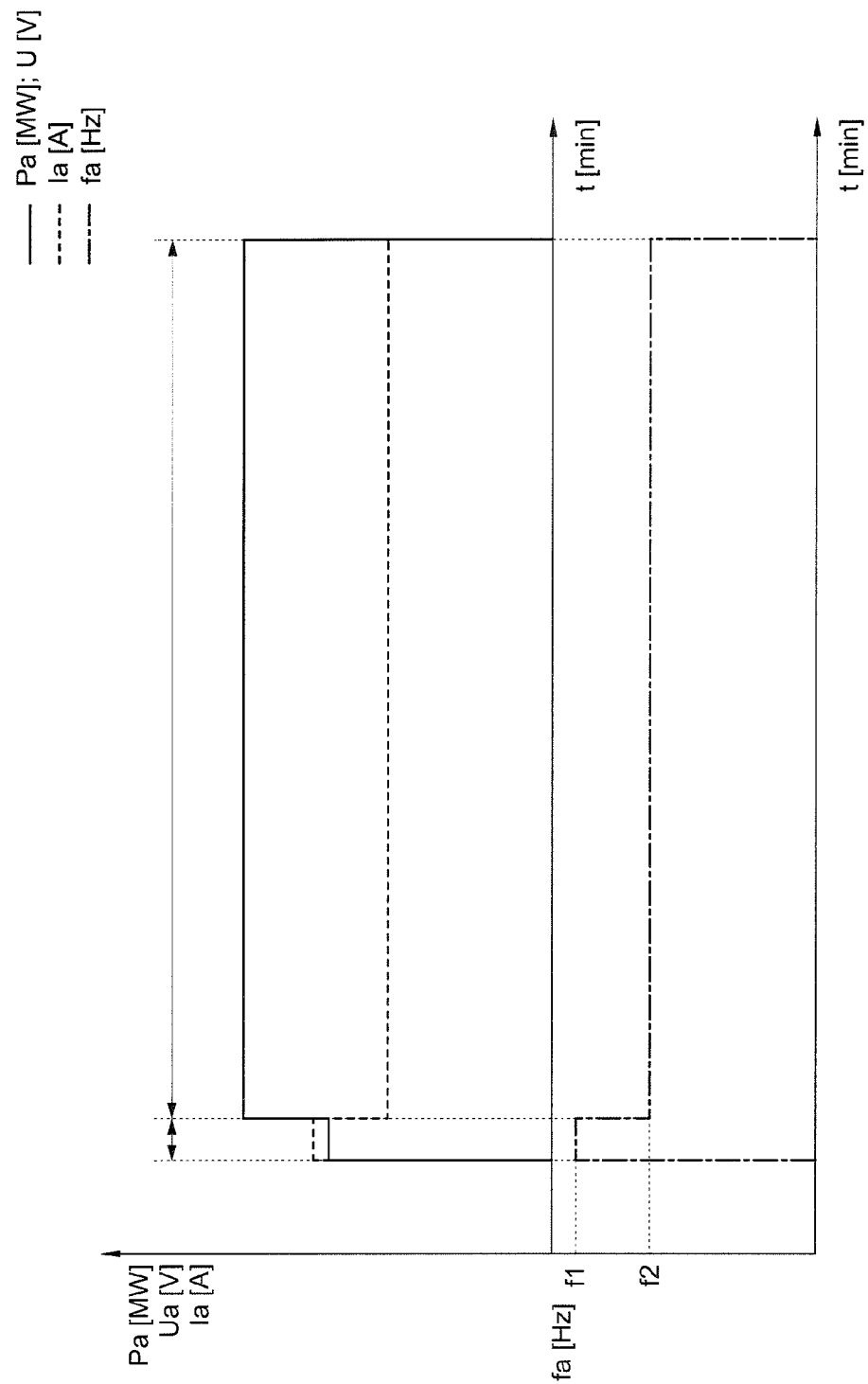
FIG. 5 is a diagram showing the variation over time of the electric parameters applied to the electrodes during a melting cycle with continuous loading of direct reduced iron, also called DRI according to embodiments of the present invention.

According to the solutions shown in FIGS. 4 and 5, the substantially continuous loading is provided which is started before the perforation step and continues until the furnace is completely filled and during the step of melting the metal material.

According to a possible solution of the invention, the electric power frequency "fa" is varied during the melting process so that in the perforation step the electric power frequency "fa" has at least a first value f1, in the melting step it has at least a second value f2 lower than the first value f1.

According to a possible solution, in the refining step (FIGS. 3 and 4) the power frequency "fa" has at least a third value f3 lower than the second value f2.

In particular, with the expression "at least one value", we mean that the value that the power frequency assumes on each occasion must in any case always be either lower or higher than those assumed in the previous step. According to a possible solution, the first value f1 is a value higher than the mains frequency "fr".

According to possible embodiments, during the perforation step the power frequency can assume, over time, a plurality of the first values f1 which are always higher than the mains frequency "fr".

According to a possible solution, the melting step can provide that the power frequency "fa" can assume a plurality of said second values f2 which are lower than said first values f1.

According to possible solutions, the refining step can provide that the power frequency "fa" assumes a plurality of said third values f3 which are lower than said second values f2.

In particular it can be provided that, due to the control applied, said first values f1, second values f2 and third values f3 are continuously variable over time, for example by means of feedback controls.

According to a possible solution, said first value f1 is greater than the mains frequency "fr" by at least 5%, preferably by at least 10%.

The possibility of regulating the frequency, and for example increasing it with respect to the mains frequency fr allows to increase the total equivalent reactance and improve the stability of the arc in the perforation step.

The possibility of regulating the frequency, and for example reducing it, allows to reduce the losses induced on the conductors, for example due to the skin effect, and therefore increase the efficiency of the system.

According to a further solution of the present invention, the second value f2 of the electric power frequency "fa", during the melting step, is variable between 0.9 and 1.1 times the mains frequency "fr".

During the melting step, in fact, the electric power supplied to the electrodes 13 increases. By means of the control and command unit 21 the voltage Ua and power current Ia references are modified so as to increase the active power, as the arc is by now presumed to be covered and distant from the vault of the furnace, and therefore the risk of damage to the latter is avoided. In this step the arc is more stable as it is protected by the scrap or the slag.

According to a further solution of the present invention, the third value f3 of the power frequency "fa" during the refining step is comprised between 0.3 and 0.5 times the mains frequency fr. In fact, during the refining step, the process is much more stable and also requires less power. Consequently, it is possible to lower the frequency guaranteeing a sufficient stability even if the total equivalent reactance is reduced.

With the present invention, therefore, once the operator has determined work points of the electric furnace 11 in terms of power, voltage, current and power factor, the control and command unit 21 tries to follow the work points also by means of the regulation continuously performed by the power frequency "fa".

With the present invention it is therefore possible, by regulating the frequency during the different steps of the process, to optimize the electric parameters in each step. First of all, it is possible to contain the sizes (and therefore the cost) of the inductance, using it in the best possible way in the refining step.

By means of the electrical topology adopted for the convertors, it is also possible to preserve the electric network from disturbances caused by the melting process (flicker reduction, harmonics, Power Factor, etc.), guaranteeing at the same time the stability of the arc in all steps.

Furthermore, the possibility of modifying the power frequency of the electrodes with respect to the mains frequency makes it easier to size the inductive components in conditions of limited space/costs, it improves the use of the conductors, reducing the resistance and therefore the losses of the system.

Given the same arc impedance, by increasing the frequency the inductive reactance increases, and the equivalent power factor toward the load decreases, which improves the arc stability (useful when, for example, the scrap is not yet melted and the arc is not very protected) preventing it from shutting down.

It is clear that modifications and/or additions of parts may be made to the electric power method for the electric arc furnace 11 and the corresponding apparatus 10 as described heretofore, without departing from the field and scope of the present invention.

It is also clear that, although the present invention has been described with reference to some specific examples, a person of skill in the art shall certainly be able to achieve many other equivalent forms of the electric power method for the electric arc furnace 11 and the corresponding apparatus 10, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. An electric power method for an electric arc furnace, comprising:
supplying, using an electric network, of a mains voltage and a mains current having a predefined mains frequency;
transforming, using a transformer of said mains voltage and mains current, into a base voltage and a base current, selectively settable, and having a base frequency substantially equal to said mains frequency;
rectifying of said base voltage and base current by a plurality of rectifiers to obtain a direct electric voltage and current;

converting, by a plurality of convertors, of said direct electric voltage and current into an alternating power voltage and power current selectively settable by means of a control and command unit connected to said convertors;

feeding of said power voltage and power current to a plurality of electrodes of the electric arc furnace, wherein during each step of a melting cycle of said electric arc furnace, regulation devices regulate an electric power frequency of said power voltage and power current, independently of said mains frequency, obtaining a regulation, possibly also instantaneous, of the reactance of the electric power apparatus of the electric arc furnace, and in that the rectifiers are connected to the convertors by at least one intermediate circuit which works in direct current, wherein the intermediate circuit stores electricity continuously and generates a separation between the electrodes and the rectifiers, and therefore with the electric network.

2. The electric power method as in claim 1, wherein said melting cycle comprises at least a step of perforating the metal material, and a melting step, and in that in the perforation step the electric power frequency has at least a first value and in the melting step has at least a second value, lower than the first value.

3. The electric power method as in claim 2, wherein said first value is greater by at least 5%, with respect to the mains frequency.

4. The electric power method as in claim 2, wherein said second value of the electric power frequency varies between 0.9 and 1.1 times the mains frequency.

5. The electric power method as in claim 2, wherein said melting cycle comprises a step of refining the molten material, and in that in the refining step said electric power frequency has a third value, lower than the second value.

6. The electric power method as in claim 5, wherein said third value of the electric power frequency is comprised between 0.3 and 0.5 times the mains frequency.

7. The electric power method as in claim 1, wherein said regulation devices are selected from hysteresis modulators, or Pulse-Width-Modulation modulators.

8. An electric power apparatus for an electric arc furnace comprising:

a transformer connected to an electric network to supply a mains voltage and a mains current, having a predefined mains frequency, said transformer being configured to transform said mains voltage and said mains current into an alternating base voltage and a base current, respectively;

a plurality of rectifiers connected to the transformer and configured to transform said base voltage and said base current into a direct electric voltage and current;

a plurality of convertors connected to said rectifiers and configured to convert direct voltage and current into an alternating power voltage and current, said convertors being connected to electrodes of said electric arc furnace and to a control and command unit configured to control and command the functioning of said convertors and to regulate over time said power voltage and power current, wherein said control and command unit is provided with regulation devices configured to regulate, during each step of a melting cycle of said electric arc furnace, the electric power frequency of said power voltage and power current, independently of the mains frequency, and to obtain a regulation of the reactance of said electric power apparatus, wherein the electric power apparatus further comprises at least one intermediate circuit, which connects the rectifiers to the convertors, and works in direct current, wherein the intermediate circuit is configured to store electric energy continuously and to generate a separation between the electrodes and the rectifiers, and therefore with the electric network.

9. The electric power apparatus as in claim 8, wherein said transformer, said rectifiers, connected to said transformer, and said convertors define in their entirety a power module, and in that said electric power apparatus can be provided with a plurality of power modules, connected in parallel to each other and to said electric network and to said electric arc furnace.

10. The electric power apparatus as in claim 9, wherein said control and command unit is connected to all the power modules to control at least the respective convertors so that each module supplies the same values of voltage, current and electric frequency to power said electrodes.

11. The electric power apparatus as in claim 8, wherein said electrodes are installed on movement devices configured to selectively move said electrodes toward to/away from the metal material, and in that said control and command unit is in turn connected also to said movement device to allow to regulate the position of said electrodes in relation to the different steps of the melting process.

12. The electric power apparatus as in claim 8, wherein said regulation devices are selected from hysteresis modulators, or Pulse-Width-Modulation modulators.

* * * * *